United States Patent [19]
Fontaine et al.

[11] Patent Number: 4,632,166
[45] Date of Patent: * Dec. 30, 1986

[54] PNEUMATIC TIRES

[75] Inventors: Jean F. L. Fontaine, Buerden; Maurice Graas, Luxembourg, both of Luxembourg

[73] Assignee: The Goodyear Tire & Rubber Company, Akron, Ohio

[*] Notice: The portion of the term of this patent subsequent to Jan. 10, 2001 has been disclaimed.

[21] Appl. No.: 744,179

[22] Filed: Jun. 13, 1985

[30] Foreign Application Priority Data

Aug. 28, 1984 [EP] European Pat. Off. ........ 84630121.6

[51] Int. Cl.⁴ .............................................. B60C 11/04
[52] U.S. Cl. ................. 152/209 R; D12/144
[58] Field of Search .......... 152/209 R, 209 D, 209 A, 152/DIG. 3; D12/142, 144

[56] References Cited

U.S. PATENT DOCUMENTS

D. 207,523  4/1967  Allen .
D. 261,130 10/1981  Amarger ........................... D12/147
4,057,089 11/1977  Johannsen ....................... 152/209 R
4,424,843  1/1984  Fontaine et al. ................ 152/209 R
4,424,844  1/1984  Fontaine ......................... 112/209 R
4,545,415 10/1985  Lindner et al. ................. 152/209 R Primary Examiner—Michael Ball
Attorney, Agent, or Firm—L. R. Drayer

[57] ABSTRACT

A pneumatic tire (10) having a tread portion (11) including a continuous mid-circumferential rib (28), and primary grooves (22,23) on each side of said rib that form an "S" or "Z" shaped configuration diagonally across the tread portion. A plurality of blades (30) are arranged to extend in circumferentially spaced blade paths (34) across the tread. The blade paths (34) extend substantially continuously between the tread edges (12,13) in a diagonally opposite direction to the primary grooves (22,23) such that each primary groove is intersected by a plurality of blade paths.

10 Claims, 4 Drawing Figures

PNEUMATIC TIRES

BACKGROUND OF INVENTION

This invention relates generally to pneumatic tires and particularly to tires for automobiles.

The ground contacting tread portion of a tire is formed from a series of grooves that define ground contacting lands on the external surface of the tire. These grooves play an important part in determining the performance of the tire with regard to wear, cornering, wet skid, noise and traction.

Generally, any particular tread design involves a compromise between various required performance parameters.

The present invention provides a particularly good combination of performance characteristics.

SUMMARY OF INVENTION

According to the present invention there is provided a pneumatic tire having a ground contacting tread portion with a mid-circumferential plane and a pair of lateral edges, said tread portion having a substantially continuous mid-circumferential rib; primary lateral grooves located on each side of the rib which extend from the rib circumferentially and axially outwardly to a respective lateral edge of the tread portion, the primary lateral grooves to one side and the other of the rib extending in circumferentially opposite directions so that pairs of primary lateral grooves extend diagonally across the tread portion in either a substantially "S" shaped or substantially "Z" shaped configuration; and a plurality of blades arranged to extend in circumferentially spaced substantially continuous blade paths between the lateral edges in a diagonally opposite direction to the primary lateral grooves so that each primary lateral groove is intersected by a plurality of blade paths.

The combination of the "S" or "Z" shaped primary lateral grooves together with the blades on the opposite bias gives a ground contacting tread portion with a high axial stiffness which is good for cornering and a low circumferential stiffness which is good for wet skid and traction.

For the purpose of this invention, a blade, sometimes known as a sipe, is a narrow groove that will close in the ground contacting footprint of the tire, and a groove has a width of at least 2% of the tread width, so that it will remain open.

Preferably, the primary lateral grooves on each side of the rib are spaced apart at the respective lateral edge and are interconnected at their axially inner end portions, thereby forming isolated lands between circumferentially adjacent grooves. Each isolated land is traversed by at least four spaced blade paths, preferably including one widened portion of one of said paths. The large number of blades gives good noise performance, uniform wear properties, and good traction properties on surfaces with a low coefficient of friction.

BRIEF DESCRIPTION OF DRAWINGS

The invention will be described by way of example and with reference to the accompanying drawings in which.

DETAILED DESCRIPTION OF THE INVENTION

Figure 1:
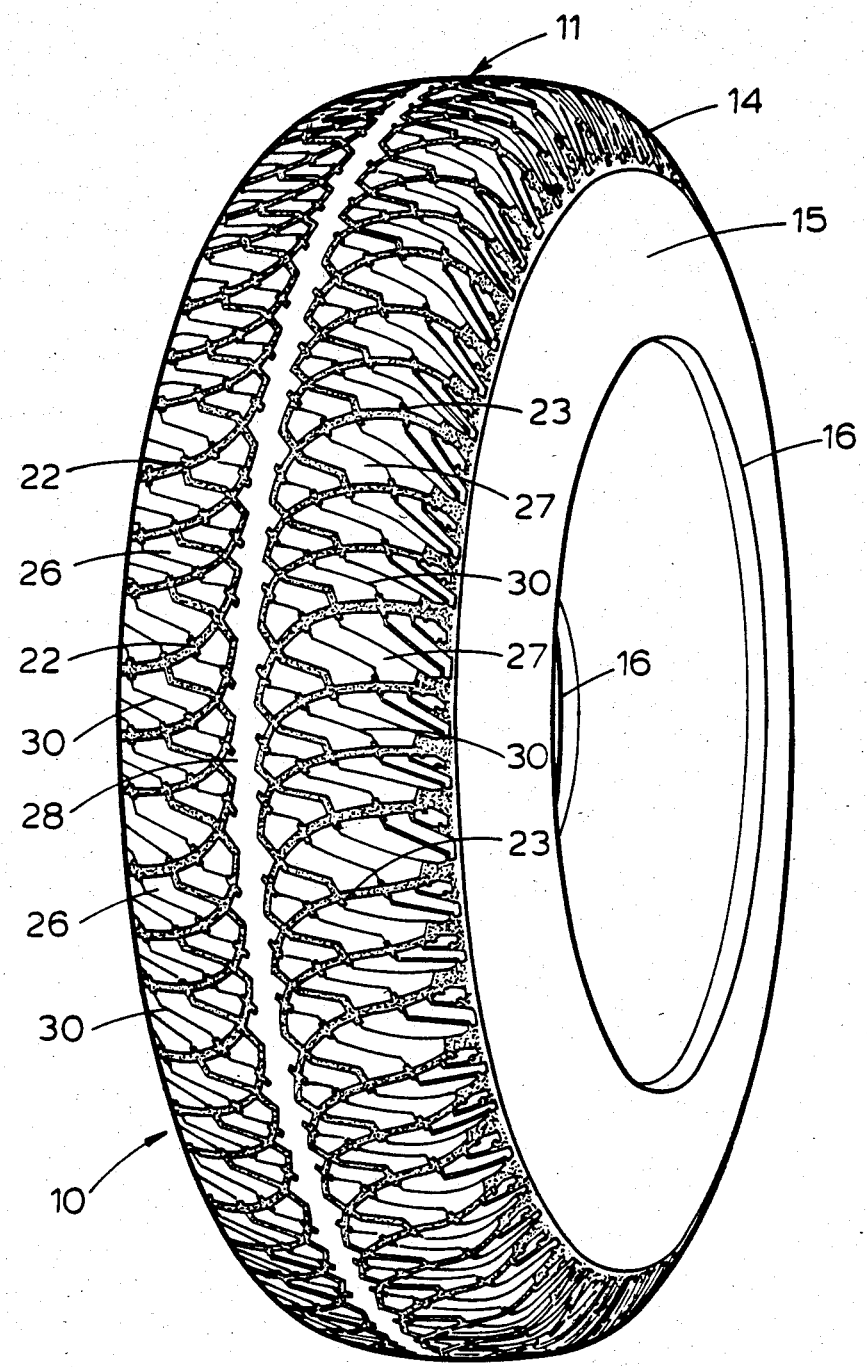
FIG. 1 is a perspective view of a tire according to this invention.
Figure 2:
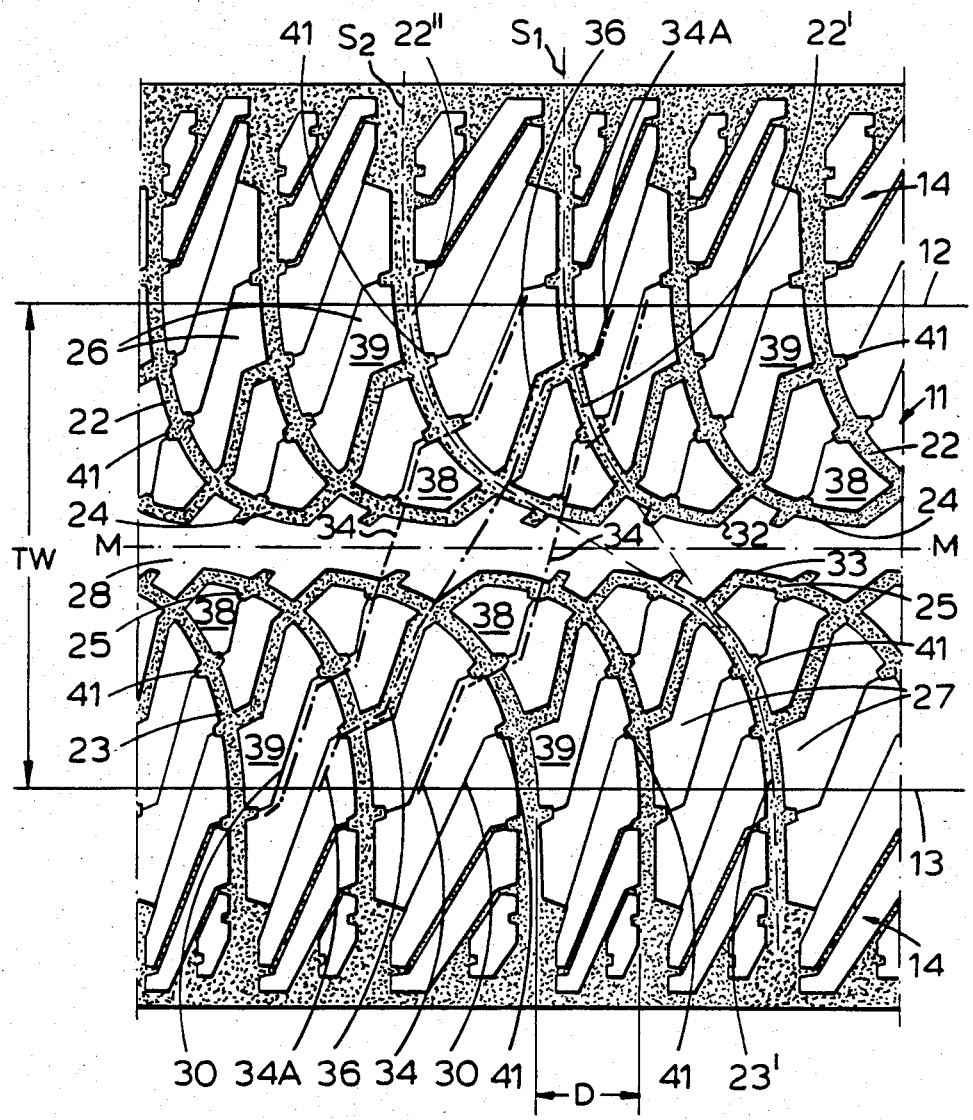
FIG. 2 is an enlarged fragmentary view of the tire illustrated in FIG. 1.

With reference to FIGS. 1 and 2 of the accompanying drawings there is illustrated a pneumatic tire 10 for a passenger car. The tire is of radial carcass construction and comprises a ground contacting tread portion 11 extending circumferentially around the tire and having a pair of lateral edges 12,13. The tire has a mid-circumferential plane M—M perpendicular to the axis of rotation of the tire and located midway between the lateral edges 12,13. The tread portion 11 is joined at the edges 12,13 to a pair of shoulders 14 each of which extends to a sidewall 15. The sidewalls 15 extend radially inwardly from the shoulders 14 and each terminates in a bead portion 16 whereby the tire is mountable on a wheel rim. For the purpose of this invention the terms "axial" and "axially" refer to displacement parallel to the axis of rotation of the tire, the term "circumferentially" refers to displacement around the rolling circumference of the tire, and the term "radially" refers to displacements perpendicular to the axis of rotation.

The tread portion 11 extends between the two lateral edges 12,13 which are spaced apart by a tread width TW. For the purposes of this invention the tread width TW is defined as the greatest axial distance across the tread as measured from the footprint of the tire when the tire is mounted on a specified rim and is inflated at a design pressure at a rated load. The tread portion 11 has a plurality of primary lateral grooves 22,23 on each side of the mid-circumferential plane M—M.

The primary lateral grooves 22,23 extend from a mid portion of the tread circumferentially and axially outward to a respective lateral edge 12 or 13. By mid portion of the tread is meant an area that extends up to 15% of the tread width TW on each side of the mid-circumferential plane M—M. The primary lateral grooves 22,23 undergo a gradual change in direction from the center of the tread to the tread edge, and form with the mid-circumferential plane of the tire an angle that increases with the axial distance from said plane. At the lateral edges 12 or 13 of the tread the respective primary lateral grooves 22 or 23 are substantially at right angles to the mid-circumferential plane. The primary lateral grooves 22 on one side of said plane M—M extend in a circumferentially opposite direction to the primary lateral grooves 23 on the other side of said plane M—M so that pairs of primary lateral grooves 22' and 23', or 22" and 23', across the tread have a substantially broken "S" shaped configuration extending diagonally across the tread from one tread edge 12 to the opposite tread edge 13. There are two alternative "S" shapes that can be envisaged, a flattened "S" comprising the primary lateral grooves 22' and 23' which are circumferentially aligned at their axially inner end portions 24 and 25 and an elongated "S" comprising the primary lateral grooves 22" and 23'. These configurations are shown in dotted lines designated S1 and S2, respectively in FIG. 2.

Alternatively if the primary lateral grooves 22,23 extended circumferentially in the opposite directions to those illustrated in FIG. 1 and FIG. 2 then the pairs of primary lateral grooves across the tread would take up a "Z" shaped configuration which would extend in a diagonally opposite direction across the tire to the "S" configuration.

The primary lateral grooves 22,23 on each side of the mid-circumferential plane M—M are circumferentially spaced apart at the respective tread edge 12 or 13 by a distance D which is between 18% and 35% of the tread width TW depending upon the variation in pitch length as is practiced in the industry for the reduction of tire noise. The axially inner end portions 24,25 of the primary lateral grooves 22,23, respectively, on each side of said plane M—M interconnect with circumferentially adjacent primary lateral grooves thereby forming isolated lands 26,27 between pairs of circumferentially adjacent primary lateral grooves. The isolated lands 26,27 on each side of the mid-circumferential plane M—M extend substantially axially from the mid-circumference of the tire to a respective lateral edge 12 or 13. The interconnected primary lateral grooves 22,23 on each side of the plane M—M have a continuous central rib 28 located axially therebetween at the mid-circumferential plane. The central rib 28 has scalloped longitudinal edges 32,33, but the shape of these longitudinal edges 32,33 will vary depending upon the shape of the axially inner end portions 24,25 of the primary lateral grooves 22,23. In this case the end portions 24,25 of each groove 22,23 extend axially outwardly to interconnect with the circumferentially adjacent primary lateral groove, thereby forming a central rib 28 of varying overall width.

The isolated lands 26,27 have a plurality of blades 30 formed therein. Groups of blades 30 are arranged in substantially end-to-end relationship to form blade paths 34,34A that extend across the tread 11. These blade paths 34,34A (three of which are highlighted by chain dotted lines in FIG. 2) extend in substantially continuous paths from one tread edge 12 to the other tread edge 13. The blade paths 34, 34A are circumferentially spaced apart and extend across the tread portion 11 in a diagonally opposite direction to the primary lateral grooves 22,23 so that each of the primary lateral grooves is intersected by a plurality of blade paths. In the present example each primary groove is crossed by four blade paths and therefore the isolated lands 26,27 are each traversed by the four blade paths 34,34A. The baldes 30 that makes up the blade paths have the same depth as the depths of the primary lateral grooves 22,23.

Each blade path 34,34A makes an overall angle with the mid-circumferential plane M—M of between 55°-75° depending upon the pitch variation between circumferentially adjacent primary lateral grooves. By overall angle is meant the angle between the plane M—M and a straight line drawn between the points of intersection of the blade path with the lateral edges 12,13. The angle the blade paths 34,34A make with the mid-circumferential plane will vary. Each blade path 34,34A traverses two adjacent lands on each side of the plane, that is four lands in total. The blade paths 34,34A run side by side across the tread 11 such that each blade path does not intersect any other blade path. Each blade path 34,34A follows an irregular zig-zag path across the tread portion 11, in that each blade path 34,34A follows a generally diagonal path across the tread but changes direction so as to be perpendicular to, or substantially perpendicular to each primary lateral groove 22,23 it crosses. As a consequence each blade path 34,34A follows a generally "dog-leg" shaped path across each land 26,27 in that it has at least one change of orientation with respect to the mid-circumferential plane as it traverses the respective land. This change in direction gives the irregular zig-zag form to the blade path. By "perpendicular" is meant an angle of not more than 20° from the normal.

While the blade paths are shown as being interrupted at the central rib 28 it is envisaged that blades 30 could also extend across the rib 28.

Circumferentially alternate blade paths 34A have axially inner portions extending between adjacent primary grooves 22 and 23 which are widened out into secondary lateral grooves 36 which are substantially parallel with the other blades 30 and which divide each land 26 or 27 into two parts, an axially inner part 38 and an axially outer part 39. Each secondary groove 36 interconnects directly with the axially inner end portion 24 or 25 of the next circumferentially adjacent primary groove 22 or 23. Where each blade path 34 intersects a primary lateral groove 22 or 23 there is a small notch 41 indented into each face of a land 26,27, or the central rib 28 which is adjacent the point of intersection.

In the footprint of the tire the blades 34 close so that the lands 26 and 27 function as their two separate parts 38 and 39. The secondary grooves 36 help the removal of water from the center portion of the tire.

Figure 3:
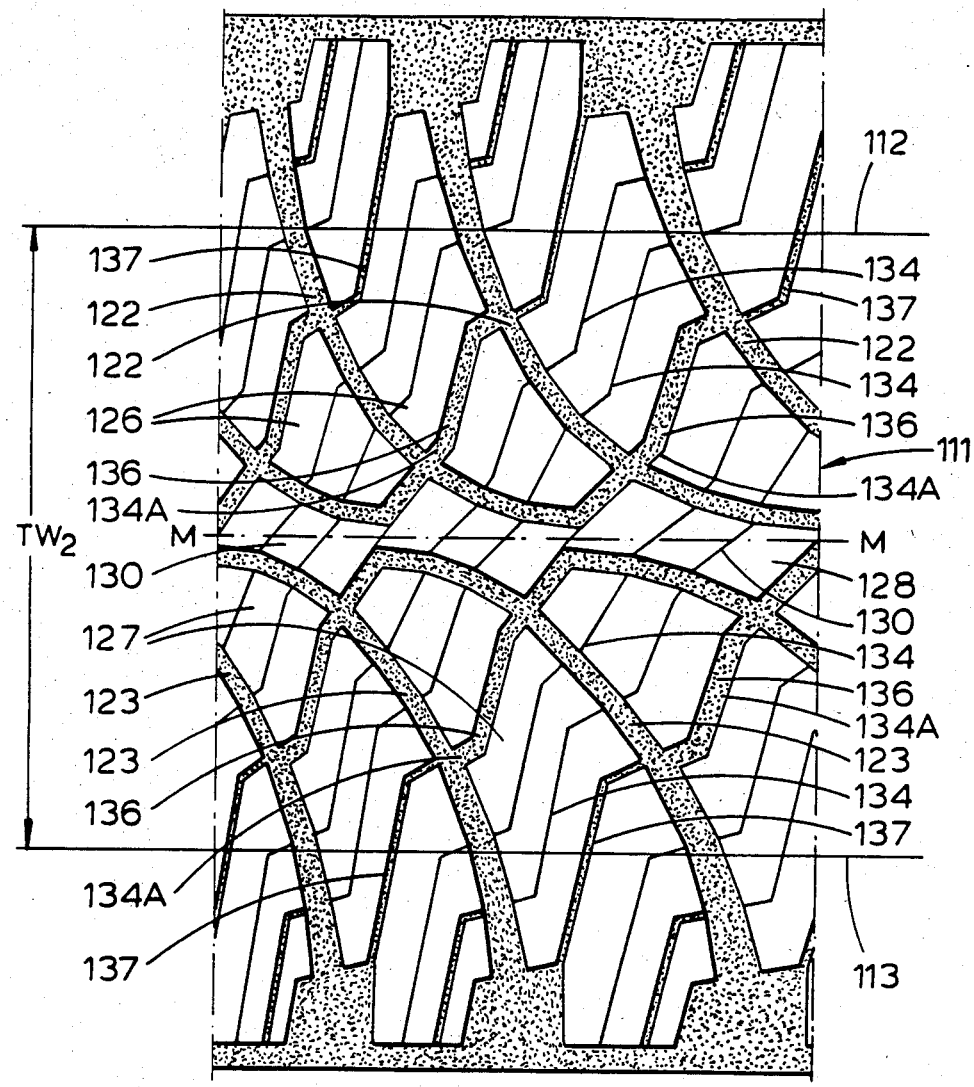
FIG. 3 is an enlarged fragmentary view of a second embodiment of the present invention.

In FIG. 3 there is illustrated a second embodiment of the invention. Only the major differences relative to the tire illustrated in FIG. 1 and FIG. 2 will be highlighted. The primary lateral grooves 122 and 123 extend from within 2% of the tread width $TW_2$ on each side of the mid-circumferential plane M—M, circumferentially and axially outwards to the tread edges 112,113. The curve of the lateral grooves 122,123 is not so steep as the curve for the previous embodiment, so that any tangent drawn to the curve makes an angle of less than 80° with the mid-circumferential plane. Each lateral groove 122,123 increases in width as it extends axially outwardly. This helps to keep a constant land to sea ratio across the tread that is the ground contacting area of the tread relative to the projected area of the grooves. As previously described the lateral grooves 122, 123 form an "S" shaped configuration across the tread portion 111 and the blade paths 134 extend across the tread in a diagonally opposite direction. In this embodiment each blade path 134 also includes a blade 130 which extends across the rib 128.

The lands 126,127 located between circumferentially adjacent lateral grooves 122,123 respectively, are each subdivided by six blade paths 134, and in this embodiment every third blade path 134A circumferentially around the tread has axially inner widened portions 136 which form a secondary lateral groove, and axially outer portions 137 extending between a lateral groove 122 or 123 and the adjacent tread edge 112 or 113 which are wider than the blades 134 but narrower than the secondary grooves 136.

Figure 4:
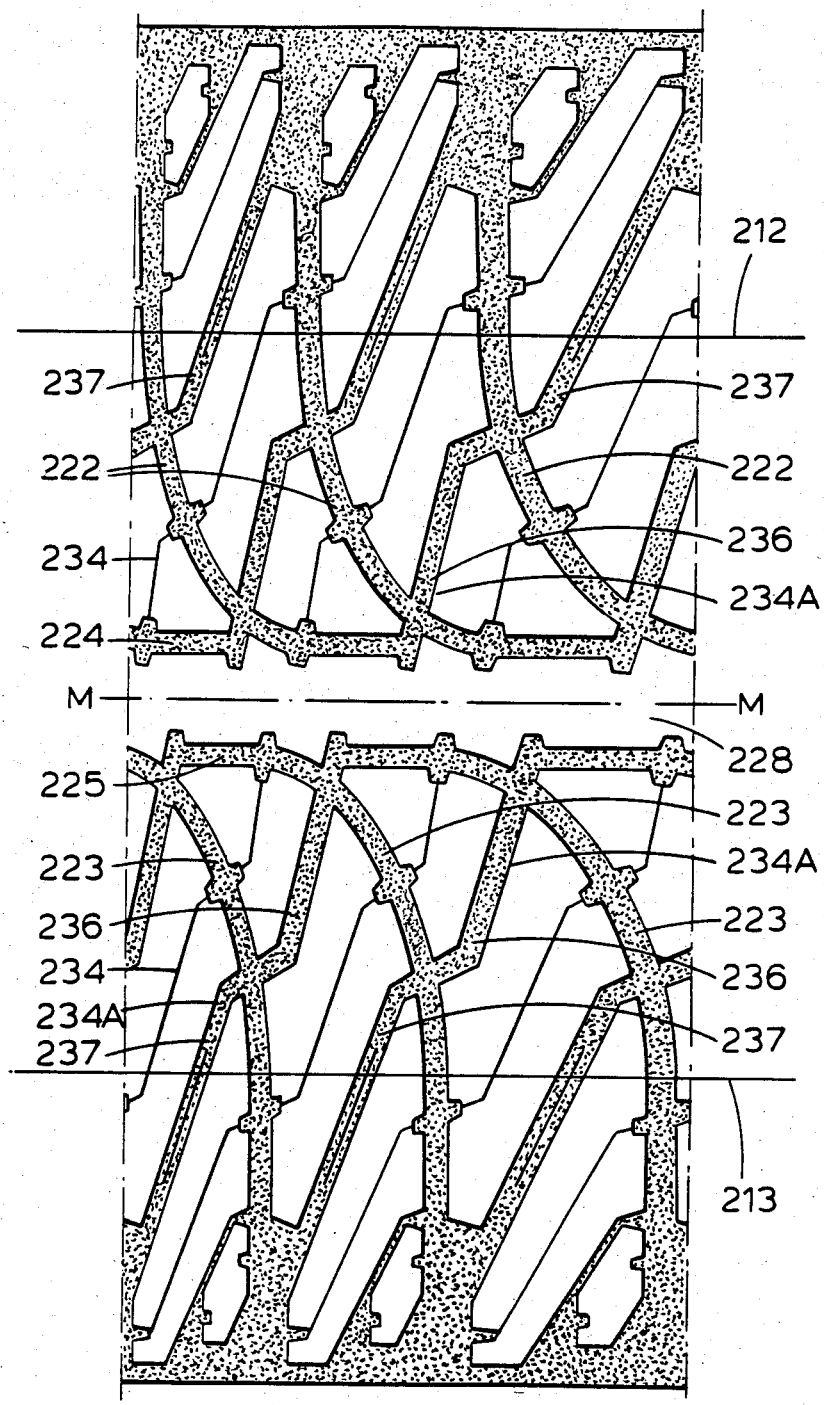
FIG. 4 is an enlarged fragmentary view of a third embodiment of the invention.

In FIG. 4 there is illustrated a third embodiment of this invention. This embodiment is very similar to the embodiment described with reference to FIG. 1 and FIG. 2. The primary lateral grooves 222,223 have axially inner end portions 224,225 which extend substantially circumferentially thereby forming a central rib 228 of a substantially constant axial width. The primary lateral grooves 222,223 then extend circumferentially and axially across the tread, as in FIG. 1, and are substantially normal to the mid-circumferential plane M—M at the respective tread lateral edge 212 or 213.

The blade paths 234 are arranged in a similar manner to those illustrated in FIG. 1 and FIG. 2 and every other blade path 234A circumferentially around the tread has an axially inner widened portion 236 forming a secondary groove as previously described. However, the axially outer portion 237 of each secondary groove is also widened out so that the secondary grooves extend from the axially inner end portions 224,225 of each primary lateral groove 222,223 to the respective tread edge 212 or 213. These outer portions are not as deep as the primary grooves, varying between 70% to 90% of the primary groove depth.

While certain representative embodiments and details have been shown for the purpose of illustrating the invention, it will be apparent to those skilled in the art that various changes and modifications could be made without departing from the scope of the invention. For example the configuration of the center rib can be varied by altering the configuration of the axially inner end portions of the primary grooves.

We claim:

1. A pneumatic tire comprising a ground contacting tread portion with a mid-circumferential plane and a pair of lateral edges, said tread portion having a substantially continuous central rib at the mid-circumferential plane; primary lateral grooves located on each side of the rib extend from the rib circumferentially and axially outwardly to a respective lateral edge, the primary lateral grooves on each side of the rib being spaced apart from one another at the respective lateral edge while being interconnected at their axially inner end portions thereby forming isolated lands between pairs of circumferentially adjacent primary lateral grooves, the primary lateral grooves to one side and the other of the rib extending in circumferentially opposite directions so that pairs of primary lateral grooves extend diagonally across the tread portion in either a substantially "S" shaped or substantially "Z" shaped configuration; and a plurality of blades arranged to extend in circumferentially spaced substantially continuous blade paths between the lateral edges in a diagonally opposite direction to the primary lateral grooves such that each primary lateral groove is intersected by a plurality of blade paths, some of the blade paths having axially inner portions which extend between circumferentially adjacent primary lateral grooves and which are widened out into secondary lateral grooves which divide each land into axially inner and outer parts, each secondary groove interconnecting directly with the axially inner end portion of a primary lateral groove.

2. A pneumatic tire as claimed in claim 1 wherein the blade paths across the tread portion do not intersect any other blade path.

3. A pneumatic tire as claimed in claim 2 wherein the blade paths made an overall diagonal bias angle relative to the mid-circumferential plane of between 55°–75° (fifty five to seventy five degrees).

4. A pneumatic tire as claimed in any one of claims 1, 2 or 3 wherein each isolated land is traversed by at least four blade paths.

5. A pneumatic tire as claimed in claim 4 wherein circumferentially alternate blade paths are widened along their entire length.

6. A pneumatic tire as claimed in claim 1 wherein each primary lateral groove increases in width with increasing axial displacement from the mid-circumferential plane.

7. A pneumatic tire as claimed in any one of claims 1, 2 or 3, wherein each blade path is in the form of an irregular zig-zag path and the blade path at its intersection with each primary lateral groove is substantially perpendicular thereto.

8. A pneumatic tire as claimed in any one of claims 1, 2 or 3 wherein each blade path follows an irregular zig-zag path across the tread portion, each blade path having at least one change of orientation with respect to the mid-circumferential plane as it traverse each land.

9. A pneumatic tire as claimed in claim 8 wherein said primary lateral grooves follow a smooth, curved path.

10. A pneumatic tire as claimed in claim 9 wherein each said blade path at its intersection with each primary lateral groove is substantially perpendicular thereto.

* * * * *